United States Patent
Bock et al.

(10) Patent No.: US 11,910,109 B2
(45) Date of Patent: Feb. 20, 2024

(54) PIXEL SIZE REDUCTION METHOD FOR EVENT DRIVEN SENSORS

(71) Applicant: APPLE INC., Cupertino, CA (US)

(72) Inventors: Nikolai E. Bock, San Jose, CA (US); Emanuele Mandelli, Mountain View, CA (US); Dario Clocchiatti, Berkeley, CA (US)

(73) Assignee: Apple Inc., Cupertino, CA (US)

( * ) Notice: Subject to any disclaimer, the term of this patent is extended or adjusted under 35 U.S.C. 154(b) by 199 days.

(21) Appl. No.: 17/376,264

(22) Filed: Jul. 15, 2021

(65) Prior Publication Data
US 2021/0344854 A1 Nov. 4, 2021

Related U.S. Application Data

(63) Continuation of application No. PCT/US2020/014347, filed on Jan. 21, 2020.

(60) Provisional application No. 62/795,777, filed on Jan. 23, 2019.

(51) Int. Cl.
*H04N 25/50* (2023.01)
*H04N 25/75* (2023.01)
*H04N 25/77* (2023.01)

(52) U.S. Cl.
CPC ............. *H04N 25/50* (2023.01); *H04N 25/75* (2023.01); *H04N 25/77* (2023.01)

(58) Field of Classification Search
CPC ........ H04N 25/47; H04N 25/40; H04N 5/341; H04N 25/50; H04N 5/351; H04N 25/75; H04N 5/378; H04N 25/77; H04N 5/3745; H04N 25/766; H04N 5/3741
See application file for complete search history.

(56) References Cited

U.S. PATENT DOCUMENTS

| 9,826,186 B2 | 11/2017 | Totsuka et al. |
| 2016/0094787 A1* | 3/2016 | Govil ............... G06V 10/955 348/310 |
| 2016/0286152 A1 | 9/2016 | Kobayashi et al. |
| 2017/0059399 A1* | 3/2017 | Suh ............... H04N 25/77 |

(Continued)

FOREIGN PATENT DOCUMENTS

| EP | 3139595 A1 | 3/2017 |
| KR | 10-2015-0068429 | 6/2015 |

(Continued)

OTHER PUBLICATIONS

Korean Intellectual Property Office, Notice of Preliminary Rejection (with English translation), Korean Patent Application No. 10-2021-7023305, 17 pages, dated Dec. 12, 2022.

(Continued)

*Primary Examiner* — Nicholas G Giles
(74) *Attorney, Agent, or Firm* — Thompson Hine LLP

(57) ABSTRACT

In one implementation, an event sensor includes a plurality of pixels, an external readout line shared among the plurality of pixels, and an external processing circuit. Each pixel is configured to output pixel data indicative of an intensity of incident illumination. The external processing circuit is configured to output a stream of pixel events. Each respective pixel event is generated when a comparator of the external processing circuit obtains a sample of pixel data from a particular pixel via the external readout line that breaches a threshold value.

20 Claims, 8 Drawing Sheets

(56) References Cited

U.S. PATENT DOCUMENTS

| | | | |
|---|---|---|---|
| 2017/0195596 A1 | 7/2017 | Vogelsang et al. | |
| 2018/0184018 A1 | 6/2018 | Itano et al. | |
| 2020/0128205 A1* | 4/2020 | Sakakibara | H04N 25/44 |
| 2022/0038645 A1* | 2/2022 | Takahashi | H04N 25/47 |

FOREIGN PATENT DOCUMENTS

| | | |
|---|---|---|
| KR | 10-2017-0027107 | 3/2017 |
| WO | 2017/149433 A1 | 9/2017 |

OTHER PUBLICATIONS

International Search Report and Written Opinion of the International Searching Authority, International Application No. PCT/US2020/014347, 13 pages, dated May 13, 2020.

Hamamoto, T. et al., "Focal Plane Compression and Enhancement Sensors," Proceedings of 1997 IEEE International Symposium on Circuits and Systems (ISCAS '97), 4 pages, Hong Kong, Jun. 9-12, 1997.

Korean Intellectual Property Office, Notice of Final Rejection (with English translation), Korean Patent Application No. 10-2021-7023305, 8 pages, dated Jul. 10, 2023.

* cited by examiner

PIXEL SIZE REDUCTION METHOD FOR EVENT DRIVEN SENSORS

TECHNICAL FIELD

The present disclosure generally relates to the field of image processing, and in particular, to techniques for reducing a pixel size of event driven sensors.

BACKGROUND

An event camera may include an image sensor that is referred to as a dynamic vision sensor ("DVS"), a silicon retina, an event-based sensor, or a frame-less sensor. Thus, the event camera generates (and transmits) data regarding changes in light intensity at each pixel sensor as opposed to data output by frame-based cameras regarding absolute light intensity at each pixel. Stated differently, while a frame-based camera will continue to generate (and transmit) data regarding absolute light intensity at each pixel when an illumination level of a scene disposed within its field of view remains static, an event camera will refrain from generating or transmitting data until a change in the illumination level is detected.

Existing event sensors may include pixels that locally process the data regarding changes in light intensity. Providing such pixel-level processing of the data within each pixel of the event sensor may limit event sensor usage in some imaging applications. For example, pixel-level processing of that data involves various in-pixel components, such as a comparator and a controller within each pixel that increase the overall physical dimensions ("pixel size") of each pixel. That increase in pixel size may limit the resolution of image data output by the event sensor. Thus, reducing a pixel size of event sensor pixels may facilitate expanded usage of event sensors in some imaging applications.

SUMMARY

Various implementations disclosed herein relate to techniques for reducing a pixel size of event driven sensors. In one implementation, an event sensor includes a plurality of pixels, an external readout line shared among the plurality of pixels, and an external processing circuit. Each pixel is configured to output pixel data indicative of an intensity of incident illumination. The external processing circuit is configured to output a stream of pixel events. Each respective pixel event is generated when a comparator of the external processing circuit obtains a sample of pixel data from a particular pixel via the external readout line that breaches a threshold value. In one implementation, the external processing circuit could be shared between a subset of pixels, where multiple external processing units are used to service the whole pixels array. In one implementation, an external processing circuit could be located on a second layer or wafer of a stacked sensor, occupying the area under the pixels.

In another implementation, a pixel includes a photodetector circuit, an output node, and a readout switch intervening between the photodetector circuit and the output node. The photodetector circuit is configured to generate pixel data indicative of an intensity of incident illumination at a sample node. The output node is coupled to an external processing circuit via an external readout line shared among a plurality of pixels. The external processing circuit is configured to output a stream of pixel events with each respective pixel event being generated when a comparator of the external processing circuit obtains a sample of pixel data from a particular pixel via the external readout line that breaches a threshold value. The readout switch is configured to isolate the sample node from the output node until a selection signal is received from a controller of the external processing circuit.

In another implementation, an event sensor includes an external readout line shared among a plurality of pixels and an external processing circuit. Each pixel is configured to output pixel data indicative of an intensity of incident illumination. The external processing circuit is configured to output a stream of pixel events. Each respective pixel event is generated when a comparator of the external processing circuit obtains a sample of pixel data from a particular pixel via the external readout line that breaches a threshold value. In one implementation, a differencing operation is implemented in the column circuit outside of the pixel array by digital subtraction.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1:
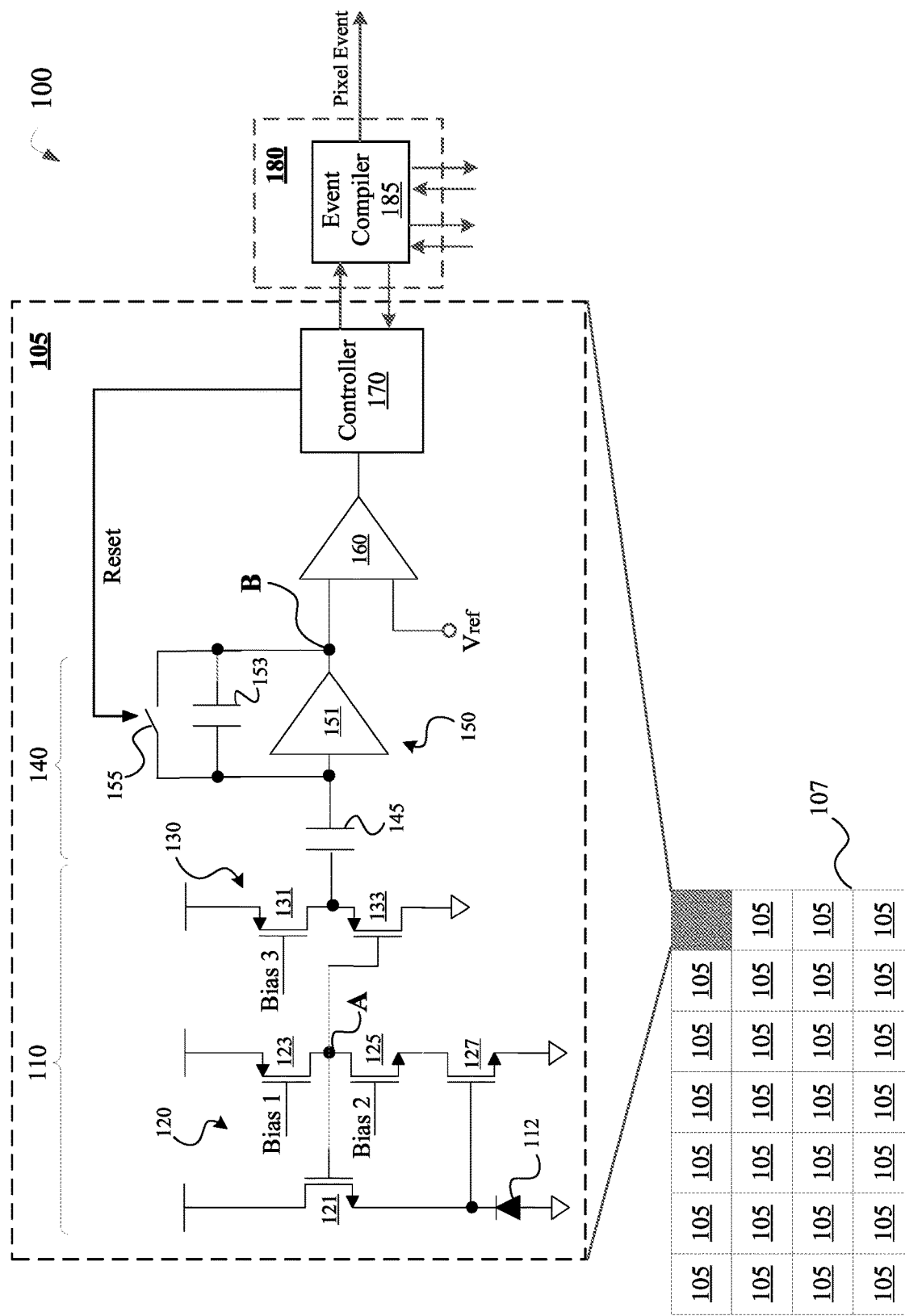
FIG. 1 illustrates a block diagram of an event sensor with a plurality of pixels that each provide pixel-level processing of pixel data within each pixel.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects or variants do not include all of the specific details described herein. Moreover, well-known systems, methods, components, devices and circuits have not been described in exhaustive detail so as not to obscure more pertinent aspects of the example implementations described herein.

A functional block diagram of an example event sensor 100 is illustrated by FIG. 1. Event sensor 100 includes a plurality of pixels 105 coupled to an external processing circuit 180 that is configured to output a stream of pixel events. In FIG. 1, the plurality of pixels 105 are arranged in a matrix 107 of rows and columns and, thus, each of the plurality of pixels 105 is associated with a row value and a column value. Each of the plurality of pixels 105 include a photodetector circuit 110, a differencing circuit 140, a comparator 160, and a controller 170.

Photodetector circuit 110 is configured to generate signals indicative of an intensity of light incident on a respective pixel 105 ("incident illumination"). To that end, photodetector circuit 110 includes a photodiode 112 configured to generate a photocurrent that is proportional to an intensity of incident illumination. The photocurrent generated by photodiode 112 flows into a logarithmic amplifier 120 formed by transistors 121, 123, 125, and 127. Logarithmic amplifier 120 is configured to convert the photocurrent into a voltage at node A with a value that is a logarithm of a value of the photocurrent. The voltage at node A is then amplified by a buffer amplifier 130 formed by transistors 131 and 133 before being applied to an input side of a differential circuit 140.

In pixel 105, differencing circuit 140 is composed of alternating current ("AC") coupling capacitor 145 and switched capacitor amplifier 150. Differencing circuit 140 is configured to remove a direct current ("DC") voltage component from the voltage at node A to produce pixel data at sampling node B. By removing the DC voltage component from the voltage at node A, the pixel data at sampling node B data provides a differential value of the intensity of incident illumination detected by photodiode 112. A gain provided by amplifier 151 corresponds to a ratio defined by the respective capacitive values of AC coupling capacitor 145 to capacitor 153. Reset switch 155 is activated (i.e., transitioned from an open state to a closed state) when a reset signal is received from controller 170. By activating reset switch 155, an operating point of amplifier 151 is reset to a reference voltage associated with a threshold value of comparator 160.

Comparator 160 is configured to provide pixel-level processing of pixel data received from sample node B. To that end, comparator 160 outputs an electrical response (e.g., a voltage) when the pixel data received from sample node B indicates that photodiode 112 detected a change in an intensity of incident illumination that breaches a threshold value. Alternatively, comparator 160 refrains from outputting an electrical response when the pixel data received from sample node B indicates that photodiode 112 did not detect a change in the intensity of incident illumination that breaches the threshold value. In one implementation, comparator 160 is implemented using a plurality of comparators comprising a first comparator that is configured to output an electrical response indicative of positive events (e.g., events having a positive polarity) and a second comparator that is configured to output an electrical response indicative of negative events (e.g., events having a negative polarity). In one implementation, the first comparator outputs an electrical response when the pixel data received from sample node B indicates that photodiode 112 detected a change in the intensity of incident illumination that breaches a positive threshold value. In one implementation, the second comparator outputs an electrical response when the pixel data received from sample node B indicates that photodiode 112 detected a change in the intensity of incident illumination that breaches a negative threshold value. Controller 170 is configured to coordinate with other components of the event sensor 100 (e.g., controllers within other pixels) to communicate an event signal to an event compiler 185 of the external processing circuit 180 for each electrical response output by comparator 160. In one implementation, reset switch 155 receives a reset signal from controller 170 each time comparator 160 obtains pixel data at sampling node B that breaches the threshold value.

Event compiler 185 receives events signals from each of the plurality of pixels that each represent a change in an intensity of incident illumination breaching the threshold value. In response to receiving an event signal from a particular pixel of the plurality of pixels 105, event compiler 185 generates a pixel event. Furthermore, event compiler 185 populates the pixel event with information indicative of an electrical response (e.g., a value and/or polarity of the electrical response) included in the event signal. In one implementation, event compiler 185 also populates the pixel event with one or more of: timestamp information corresponding to a point in time at which the pixel event was generated and an address identifier corresponding to the particular pixel that sent the event signal which triggered the pixel event. A stream of pixel events including each pixel event generated by event compiler 185 may then be communicated to image or video processing circuitry (not shown) associated with event camera 100 for further processing.

By way of example, the stream of pixel events generated by event compiler 185 can be accumulated or otherwise combined to produce image data. In some implementations the stream of pixel events is combined to provide an intensity reconstruction image. In this implementation, an intensity reconstruction image generator (not shown) may accumulate pixel events over time to reconstruct/estimate absolute intensity values. As additional events are accumulated the intensity reconstruction image generator changes the corresponding values in the reconstruction image. In this way, it generates and maintains an updated image of values for all pixels of an image even though only some of the pixels may have received events recently.

In various implementations, reducing a pixel size of event sensor pixels is effectuated by processing pixel data output by a plurality of pixels with an external processing circuit shared among the plurality of pixels. Stated differently, pixel size reduction is effectuated in various implementations by providing external processing of pixel data generated by multiple pixels instead of providing pixel-level processing of pixel data. The circuit diagrams depicted in FIGS. 2 and 5-8 provide various implementations of pixels for an event sensor that facilitate such external processing of pixel data by an external processing circuit shared among multiple pixels.

Figure 2:
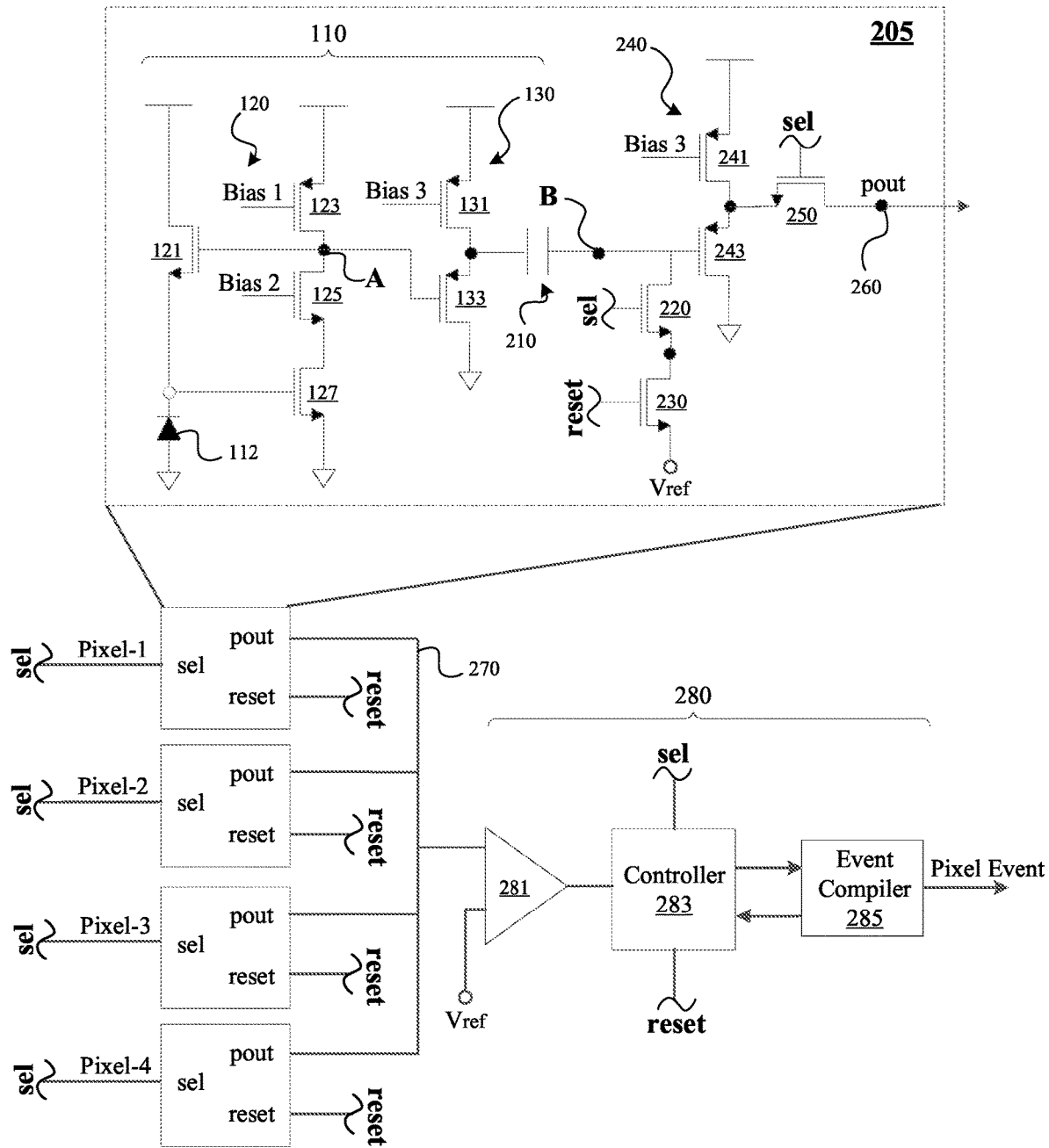
FIG. 2 illustrates a block diagram of an event sensor with an example pixel that is configured to output pixel data to an external processing circuit via an external readout line shared among a plurality of pixels.

By way of example, FIG. 2 depicts a block diagram of a plurality of pixel sensors 205 for an event sensor that each communicate pixel data representing an intensity of incident illumination to an external processing circuit 280. In the example of FIG. 2, each of the plurality of pixels 205 communicates pixel data to external processing circuit 280 via an external readout line 270 shared among the plurality of pixels 205. Similar to pixel 105 of FIG. 1, pixel 205 also includes photodetector circuit 110 configured to generate a voltage at node A proportional to an intensity of incident illumination detected by photodiode 112. AC coupling capacitor 210 removes a DC voltage component from the voltage at node A to generate pixel data at sample node B that provides a differential value of the intensity of incident illumination. Unlike pixel 105, the pixel data generated by pixel 205 at sample node B is processed external to pixel 205 by a comparator 281 of external processing circuit 280.

In one implementation, comparator 281 is implemented using a plurality of comparators comprising a first comparator that is configured to output an electrical response indicative of positive events (e.g., events having a positive polarity) and a second comparator that is configured to output an electrical response indicative of negative events (e.g., events having a negative polarity). In one implementation, the first comparator outputs an electrical response when the pixel data received from sample node B indicates that photodiode 112 detected a change in the intensity of incident illumination that breaches a positive threshold value. In one implementation, the second comparator outputs an electrical response when the pixel data received from sample node B indicates that photodiode 112 detected a change in the intensity of incident illumination that breaches a negative threshold value.

To avoid collisions between samples of pixel data sent comparator 281 by each of the plurality of pixels 205 via external readout line 270, external processing circuit 280 includes controller 283. Controller 283 is configured to arbitrate access to external readout line 270 among the plurality of pixels 205 by selectively activating a readout switch 250 located within each pixel 205 using a selection signal. For example, controller 283 may communicate a first selection signal to a readout switch located within Pixel-1 at a first time and may communicate a second selection signal to a readout switch located within Pixel-2 at a second time subsequent to the first time. In this example, the readout switch located within Pixel-1 may transfer a sample of pixel data from Pixel-1 to external readout line 270 at the first time whereas the readout switch located within Pixel-2 may transfer a sample of pixel data from Pixel-2 to external readout line 270 at the second time. In one implementation, each pixel among the plurality of pixels 205 receives a different phase of a selection signal from controller 283.

In pixel 205, readout switch 250 intervenes between sample node B and output node 260. From that position, readout switch 250 may isolate sample node B from output node 260 until a selection signal is received from controller 283. When the selection signal is received from controller 283, readout switch 250 is activated (i.e., transitioned from an non-conductive state to a conductive state). In one implementation, readout switch 250 is implemented as an n-channel MOS transistor. By activating readout switch 250, pixel data on sample node B is transferred through transistor 243 of a second buffer amplifier 240 formed by transistors 241 and 243 to output node 260.

Figure 3:
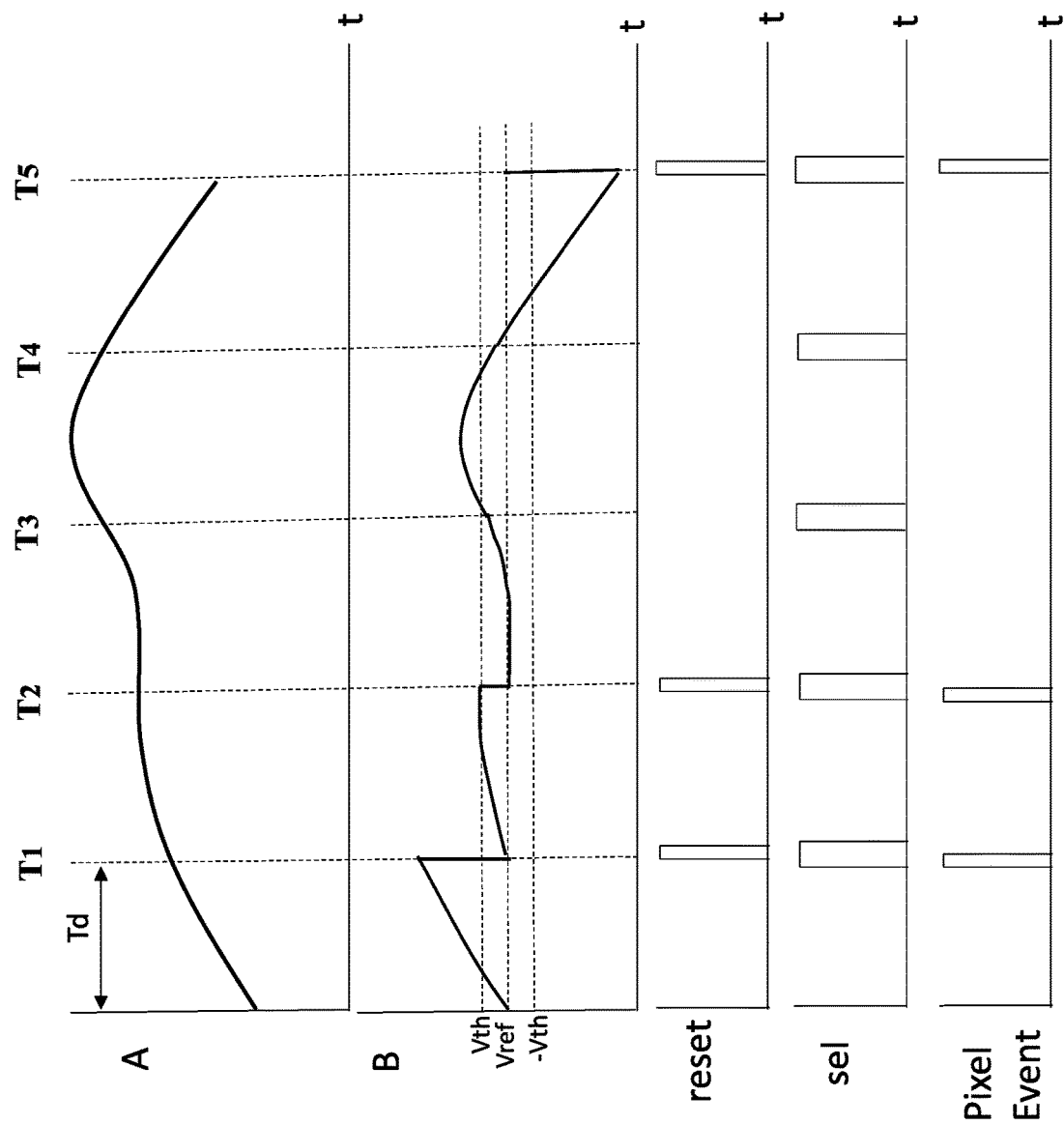
FIG. 3 is an example of a timing diagram for operations of the event sensor illustrated in FIG. 2.

Turning to the timing diagram of FIG. 3, the operations performed by event sensor 200 in generating pixel events are explained in greater detail in accordance with one implementation. At time $T_1$, readout switch 250 and selection switch 220 activate in response to receiving a selection signal from controller 283 thereby transferring a sample of pixel data to output node 260. Selection switch 220 enables reset for one of the pixels in the group of 4 pixels. The sample of pixel data transferred to output node 260 at time $T_1$ is applied to an input side of comparator 281. Since that sample of pixel data obtained by comparator 281 at time $T_1$ breaches a threshold value, comparator 281 outputs an electrical response to an input side of controller 283. Upon receiving the electrical response from comparator 281 at time $T_1$, controller 283 sends a reset signal to reset switch 230. In response to receiving the reset signal from controller 283, reset switch 230 activates thereby causing a voltage of the pixel data at sample node B to reset to reference voltage $V_{ref}$.

In addition to sending the reset signal to reset switch 230, controller 283 forwards the electrical response received from comparator 281 at time $T_1$ along with information characterizing the electrical response to event compiler 285. In various implementations, the information characterizing an electrical response may include one or more of: a value of the electrical response, a polarity of the electrical response, timestamp information corresponding to a point in time at which the event response was generated, or an address identifier corresponding to the respective pixel that triggered the generation of the pixel event. Upon receiving the event response and characterizing information from comparator 281 at time $T_1$, event compiler 285 generates a pixel event.

Unlike time $T_1$, a value of the pixel data at sample node B does not breach the threshold value at time $T_3$. Rather, the value of the pixel data at sample node B breaches the threshold value subsequent to time $T_3$. As such, the sample of the pixel data that comparator 281 obtains at time $T_3$ does not breach the threshold value, and consequently comparator 281 does not generate an electrical response at time $T_3$. Because controller 283 does not receive an electrical response from comparator 281 at time $T_3$, controller 283 neither sends a reset signal to reset switch 230 nor forwards an electrical response to event compiler 285 at time $T_3$. Consequently, a voltage of the pixel data at sample node B is not reset to reference voltage $V_{ref}$ by activation of reset switch 230 and event compiler does not generate a pixel event at time $T_3$.

Similar to time $T_1$ or time $T_2$, a value of the pixel data at sample node B breaches a threshold value at time $T_5$. Unlike time $T_1$ or time $T_2$, the value of the pixel data at sample node B does not exceed upper threshold value $V_{th}$ at time $T_5$. Instead, the value of the pixel data at sample node B is less than lower threshold value $-V_{th}$ at time $T_5$. In one implementation, a difference between upper threshold value $V_{th}$ and reference voltage $V_{ref}$ is equal or substantially equal to a difference between lower threshold value $-V_{th}$ and reference voltage $V_{ref}$. Pixel events generated by event compiler 285 at time $T_1$ or time $T_2$ may be referred to as "positive" pixel events. In one implementation, positive pixel events are pixel events with a positive polarity that represent net increases in the intensity of incident illumination that exceed a magnitude defined by the upper threshold value $V_{th}$. The pixel event generated by event compiler 285 at time $T_5$ may be referred to as a "negative" pixel event. In one implementation, negative pixel events are pixel events with a negative polarity that represent net decreases in the intensity of incident illumination that exceed a magnitude defined by the lower threshold value $-V_{th}$.

Figure 4:
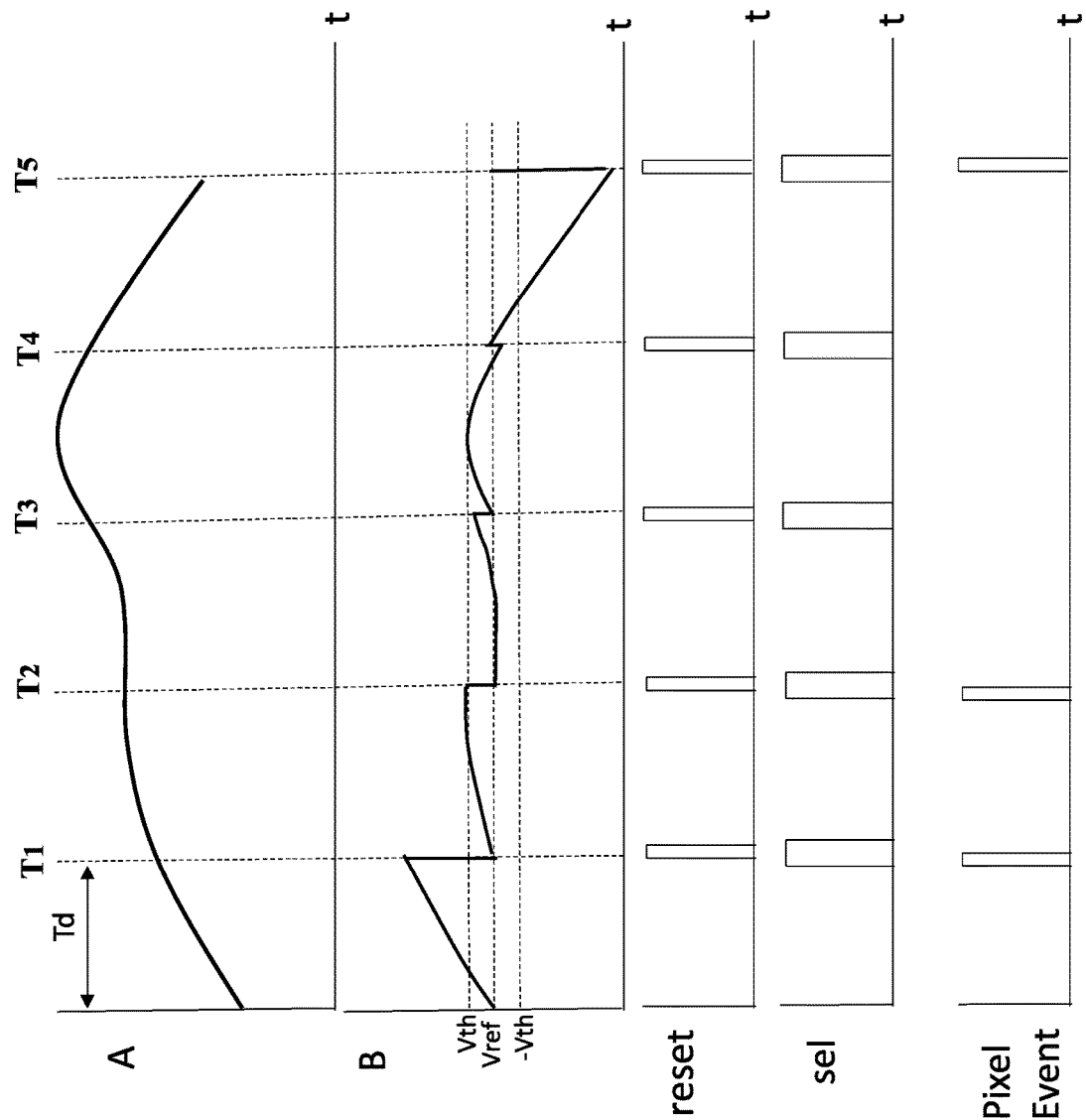
FIG. 4 is another example of a timing diagram for operations of the event sensor illustrated in FIG. 2.

FIG. 4 is a timing diagram for operations performed by event sensor 200 in generating pixel events in accordance with one implementation. In one implementation, pixel 205 can be implemented without selection switch 220. Alternatively it can be implemented by activating select switch 220 in all 4 pixels the same time. A comparison between FIGS. 3 and 4 illustrates that reset switch 230 facilitates implementing a global reset option in which a voltage of the pixel data at sample node B is reset to reference voltage $V_{ref}$ each time a sample of pixel data is transferred to output node 260. In one implementation, controller 283 implements the global reset option by initiating a delay timer when a selection signal is sent to readout switch 250 and selection switch 220 and sending a reset signal to reset switch 230 once the delay time expires.

Figure 5:
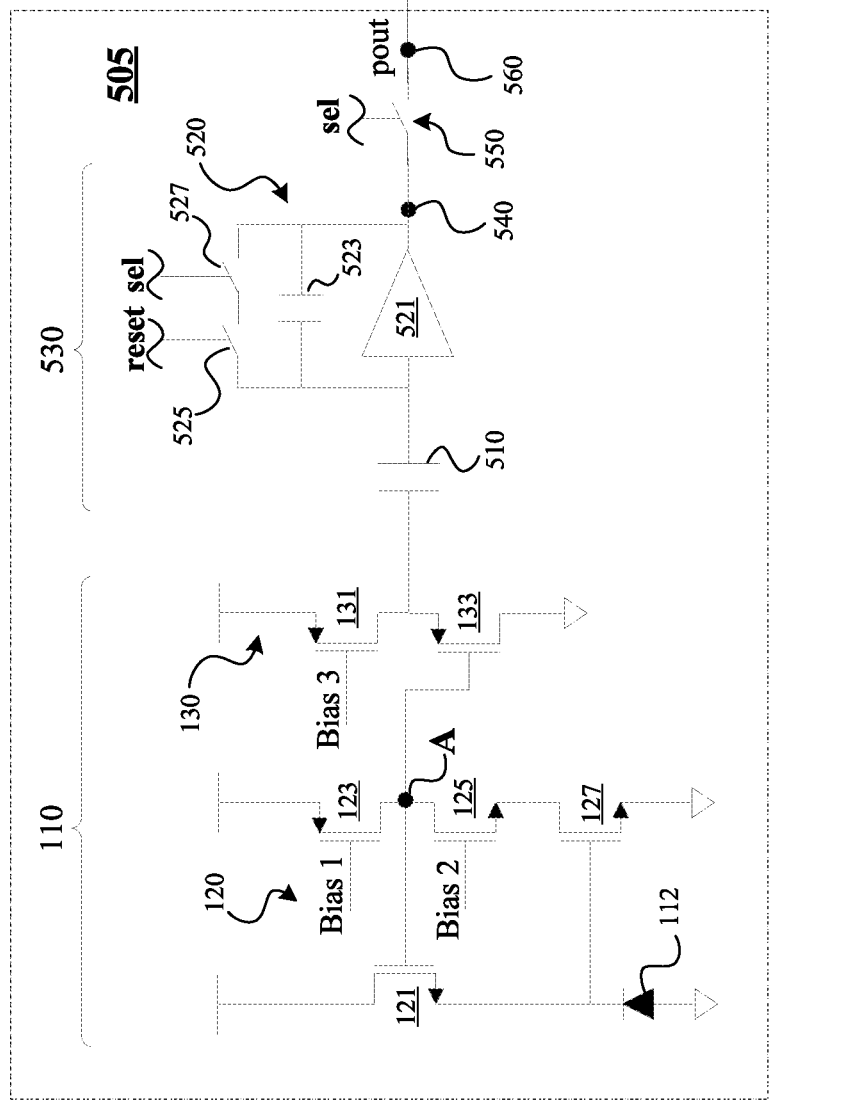
FIGS. 5-8 are circuit diagrams for other example pixels that are each configured to output pixel data to an external processing circuit via an external readout line shared among a plurality of pixels.

FIG. 5 illustrates a circuit diagram of another example pixel 505 that is configured to output pixel data to external processing circuit 280 via external readout line 270. Similar to pixel 205 of FIG. 2, pixel 505 includes photodetector circuit 110 that outputs a voltage indicative of an intensity of incident illumination detected by photodiode 112. Pixel 505 further includes a differencing circuit 530 that couples an output of photodetector circuit 110 to a readout switch 550 that is configured to isolate sample node 540 from output node 560 until a selection signal is received from controller 283. As shown by FIG. 5, differencing circuit 530 includes AC coupling capacitor 510 and switched capacitor amplifier 520. Similar to switched capacitor amplifier 150 of FIG. 1, a gain provided by amplifier 521 corresponds to a ratio defined by the respective capacitive values of AC coupling capacitor 510 to capacitor 523. Unlike switch capacitor amplifier 150, an operating point of amplifier 521 in switched capacitor amplifier 520 is reset to a reference voltage associated with a threshold value of comparator 281 by activating both reset switch 525 and selection switch 527. Reset switch 525 and selection switch 527 are activated (i.e., transitioned from an open state to a closed state) when a reset signal and a selection signal, respectively, are received from controller 283. In one implementation, switched capacitor amplifier 520 improves a signal-to-noise ratio associated with pixel data generated at sampling node 540.

Figure 6:
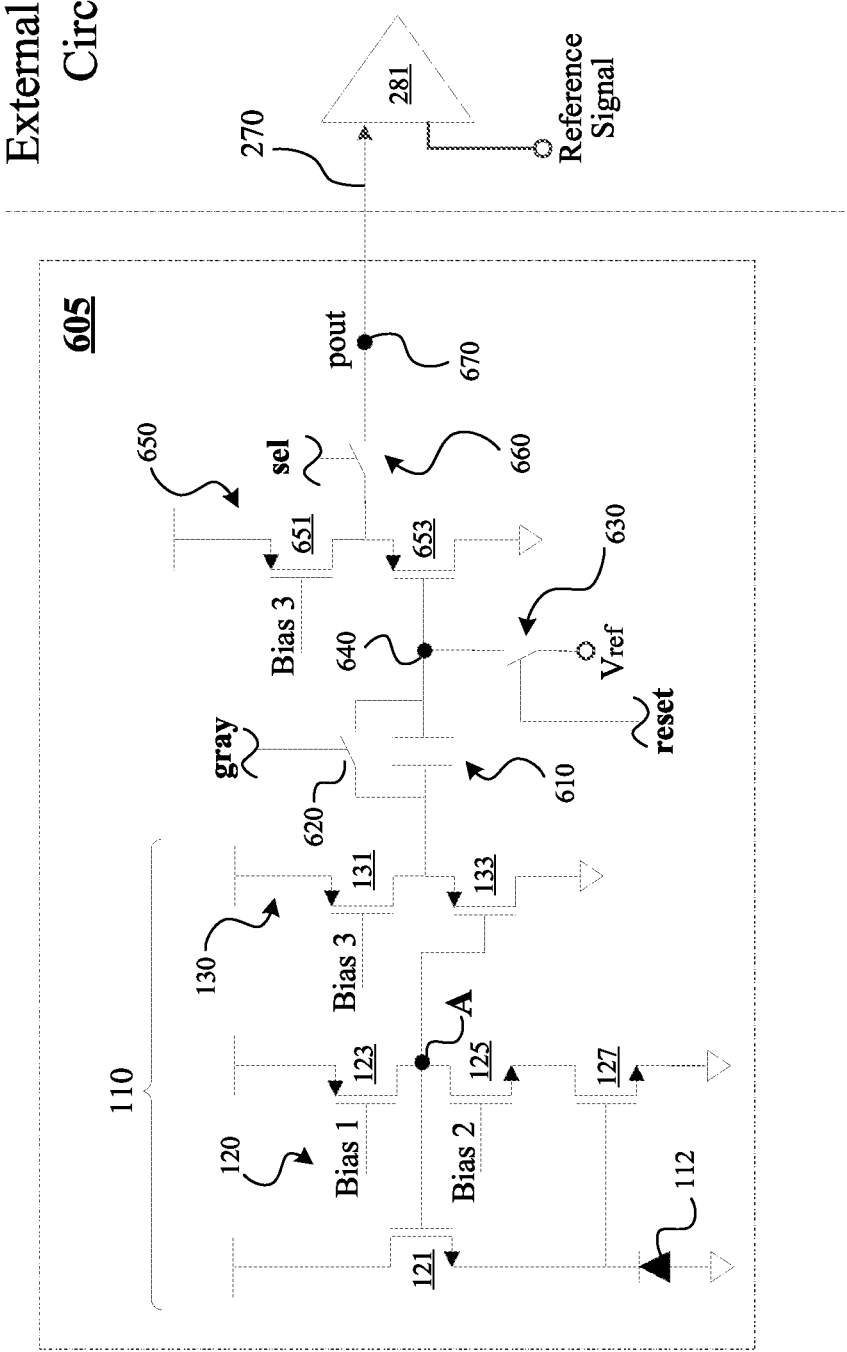

FIG. 6 illustrates a circuit diagram of another example pixel 605 that is configured to output pixel data to external processing circuit 280 via external readout line 270. In one implementation, external readout line 270 is shared among a plurality of pixels including pixel 605 that form a column of a pixel array. Pixel 605 includes an AC coupling capacitor 610 intervening between an output of photodetector circuit 110 to an input side of buffer amplifier 650 formed by transistor 651 and transistor 653. Pixel 605 further includes a readout switch 660 that is configured to isolate sample node 640 from output node 670 until a selection signal is received from controller 283. A reset switch 630 in pixel 605 is configured to reset a voltage of the pixel data at sample node 640 to a reference voltage associated with a threshold value of comparator 281 in response to receiving a reset signal from controller 283.

In pixel 605, a grayscale switch 620 is coupled in parallel with AC coupling capacitor 610. When grayscale switch 620 is in an open state, AC coupling capacitor 610 removes a DC voltage component from a voltage at node A to generate pixel data at sample node 640 that provides a differential value of the intensity of incident illumination detected by photodiode 112. In response to receiving a grayscale signal from controller 283, grayscale switch 620 transitions from the open state to a closed state thereby bypassing AC coupling capacitor 610. When grayscale switch 620 is in the closed state, the pixel data at sample node 640 provides an absolute value of the intensity of incident illumination detected by photodiode 112. In one implementation, a ramp voltage signal is compared with samples of pixel data obtained from pixel 605 on an input side of comparator 281 when grayscale switch 620 is in the closed state to generate grayscale image data on an output side of comparator 281.

Figure 7:
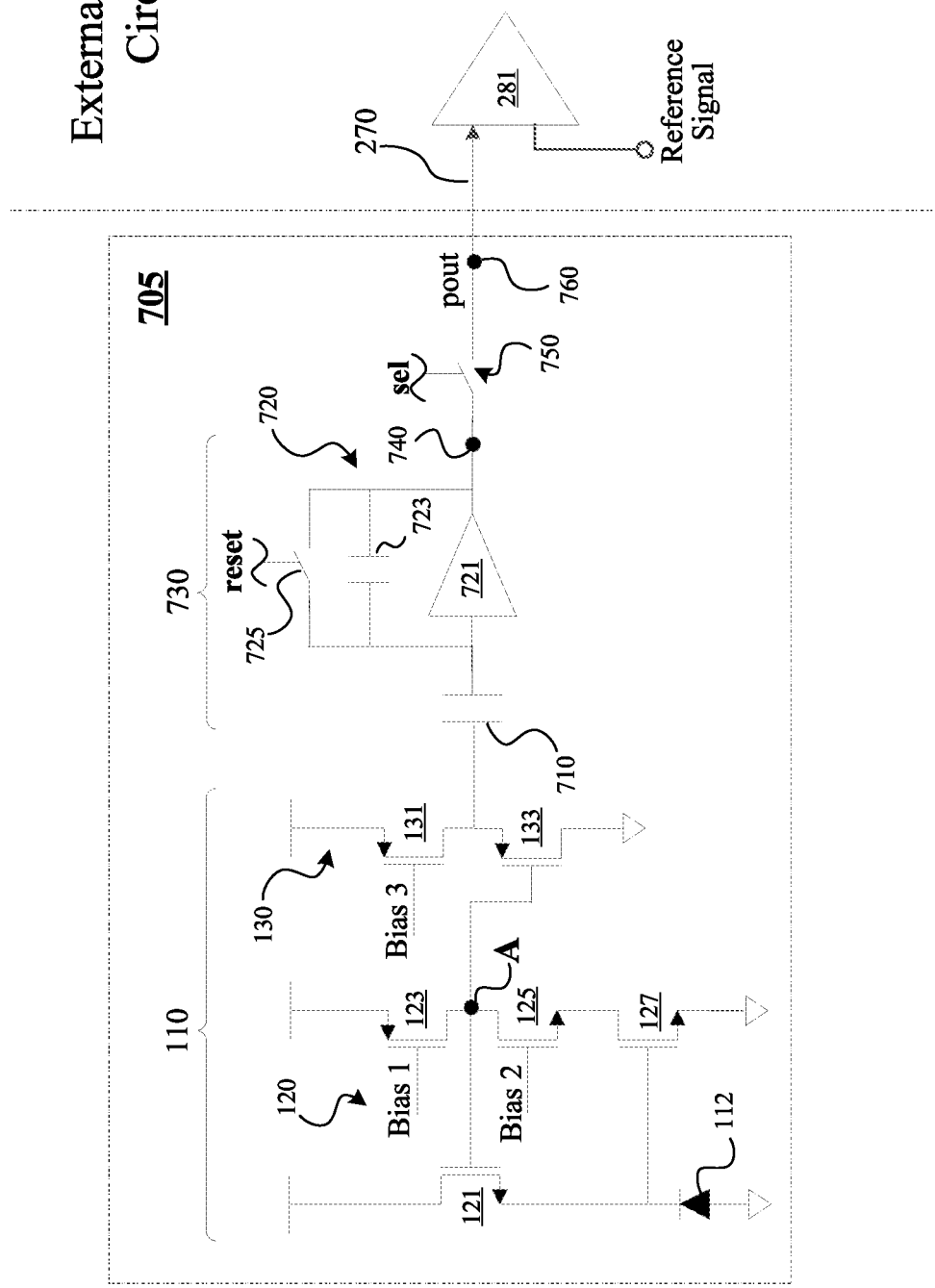

FIG. 7 illustrates a circuit diagram of another example pixel 705 that is configured to output pixel data to external processing circuit 280 via external readout line 270. In one implementation, external readout line 270 is shared among a plurality of pixels including pixel 705 that form a column of a pixel array. Pixel 705 includes a differencing circuit 730 that couples an output of photodetector circuit 110 to a readout switch 750 that is configured to isolate sample node 740 from output node 760 until a selection signal is received from controller 283. As shown by FIG. 7, differencing circuit 730 includes AC coupling capacitor 710 and switched capacitor amplifier 720. Similar to switched capacitor amplifier 150 of FIG. 1, a gain provided by amplifier 721 in switched capacitor amplifier 720 corresponds to a ratio defined by the respective capacitive values of AC coupling capacitor 710 to capacitor 723. Also similar to switch capacitor amplifier 150, an operating point of amplifier 721 is reset to a reference voltage associated with a threshold value of comparator 281 by activating reset switch 725. Reset switch 725 is activated (i.e., transitioned from an open state to a closed state) when a reset signal is received from controller 283. In one implementation, a ramp voltage signal is compared with samples of pixel data obtained from pixel 705 on an input side of comparator 281 to obtain information defining an amplitude of change in the intensity of incident illumination detected by photodiode 112 on an output side of comparator 281.

Figure 8:
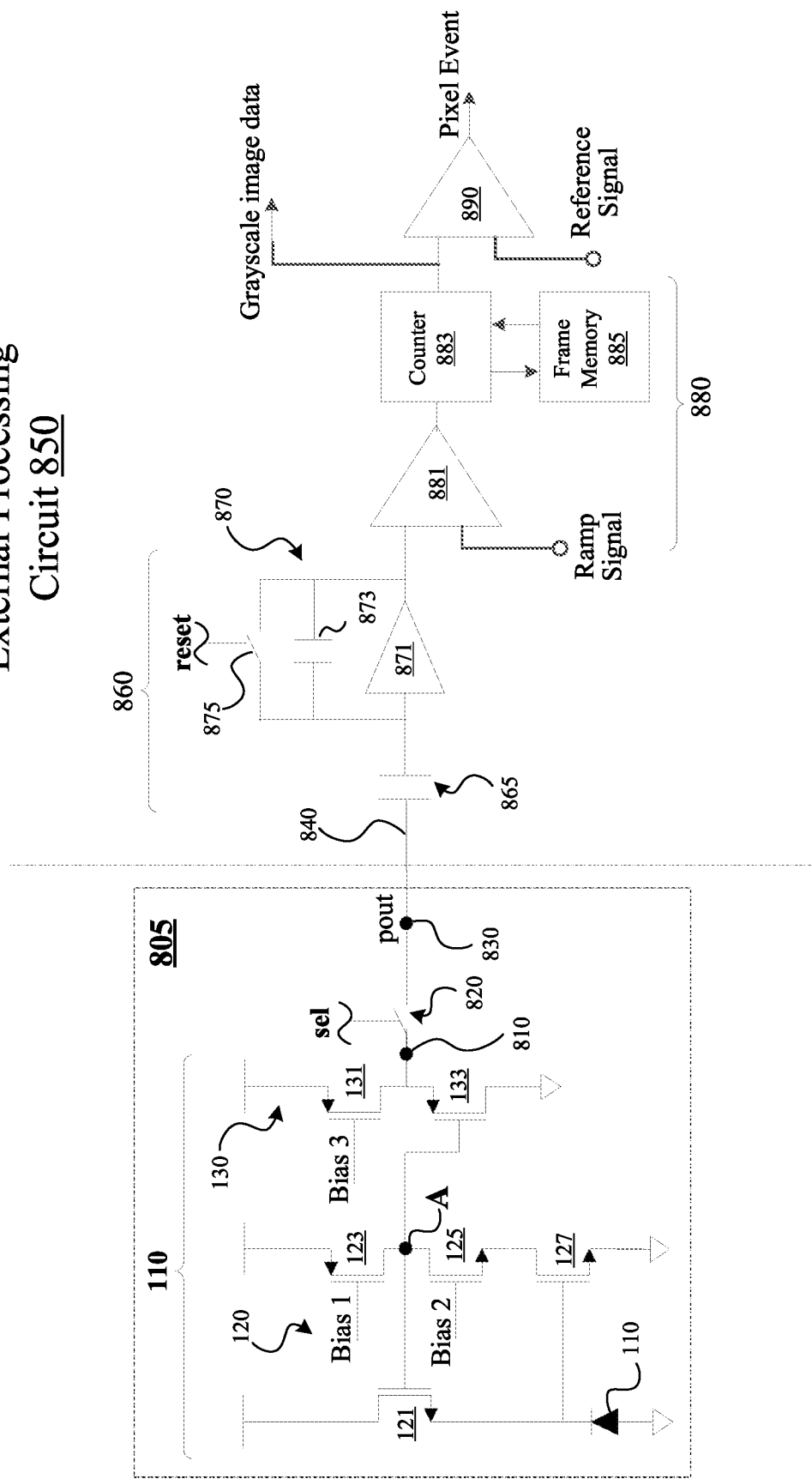

FIG. 8 illustrates a circuit diagram of another example pixel 805 that is configured to output pixel data to an external processing circuit 850 via an external readout line 840. In one implementation, external readout line 840 is shared among a plurality of pixels including pixel 805 that form a column of a pixel array. Pixel 805 includes a photodetector circuit 110 and a readout switch 820 that is configured to isolate sample node 810 from output node 830 until a selection signal is received from a controller (not shown) of external processing circuit 850. In response to receiving a selection signal from the controller, readout switch 820 activates (i.e., transitions from an open state to a closed state) and a sample of pixel data at sample node 810 is transferred to external processing circuit 850 in an analog domain.

External processing circuit 850 includes a differencing circuit 860, a digitizing circuit 880, and a comparator 890. As shown by FIG. 8, differencing circuit 860 includes AC coupling capacitor 865 and switched capacitor amplifier 870. Similar to switched capacitor amplifier 150 of FIG. 1, a gain provided by amplifier 871 in switched capacitor amplifier 870 corresponds to a ratio defined by the respective capacitive values of AC coupling capacitor 865 to capacitor 873. Also similar to switch capacitor amplifier 150, an operating point of amplifier 871 is reset to a reference voltage associated with a threshold value of digital comparator 890 by activating reset switch 875. Reset switch 875 is activated (i.e., transitioned from an open state to a closed state) when a reset signal is received from the controller.

In FIG. 8, digitizing circuit 880 includes a sampling comparator 881, a counter 883, and a frame memory 885. Digitizing circuit 880 is configured to convert samples of pixel data obtained from pixel 805 in the analog domain into digital samples of pixel data in a digital domain for further processing by digital comparator 890. A ramp voltage signal is compared with a sample of pixel data obtained from pixel 805 at a first time on an input side of sampling comparator 881 to generate a digital sample of pixel data on an output side of sampling comparator 881. That digital sample provides an absolute value of the intensity of incident illumination detected by photodiode 112 at the first time. In response to receiving the digital sample of pixel data from the output side of sampling comparator 881 corresponding to the first time, counter 883 increments and writes the digital sample to frame memory 885. In one implementation, counter 883 forwards the digital sample corresponding to the first time to image processing circuitry as grayscale image data.

At a second time subsequent to the first time, the ramp voltage signal is compared with a sample of pixel data obtained from pixel 805 the input side of sampling comparator 881 to generate another digital sample of pixel data on the output side of sampling comparator 881. In response to receiving the digital sample of pixel data from the output side of sampling comparator 881 corresponding to the second time, counter 883 decrements and the digital sample corresponding to the first time is retrieved from frame memory 885. A comparison between those digital samples is used to determine a change in the intensity of incident illumination detected by photodiode 112 between the first time and the second time. The result of that comparison is forwarded to an input side of digital comparator 890 to compare with a threshold value. If that change in the intensity of incident illumination detected by photodiode 112 breaches the threshold value, digital comparator 890 outputs a pixel event.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or value beyond those recited. Headings, lists, and numbering included herein are for ease of explanation only and are not meant to be limiting.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "or" as used herein refers to and encompasses any and all possible combinations of one or more of the associated listed items. It will be further understood that the terms "comprises" or "comprising," when used in this specification, specify the presence of stated features, integers, steps, operations, elements, or components, but do not preclude the presence or addition of one or more other features, integers, steps, operations, elements, components, or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

The foregoing description and summary of the invention are to be understood as being in every respect illustrative and exemplary, but not restrictive, and the scope of the invention disclosed herein is not to be determined only from the detailed description of illustrative implementations but according to the full breadth permitted by patent laws. It is to be understood that the implementations shown and described herein are only illustrative of the principles of the present invention and that various modification may be implemented by those skilled in the art without departing from the scope and spirit of the invention.

What is claimed is:

1. An event sensor comprising:
   a plurality of pixels, each pixel configured to output pixel data, wherein, in a first state, the pixel data provides a differential value of the intensity of incident illumination and, in a second state, the pixel data provides an absolute value of the intensity of the incident illumination;
   an external readout line shared among the plurality of pixels; and
   an external processing circuit configured to output a stream of pixel events, each respective pixel event generated when a comparator of the external processing circuit obtains a sample of pixel data from a particular pixel via the external readout line that breaches a threshold value.

2. The event sensor of claim 1, wherein the external processing circuit comprises:
   a controller configured to arbitrate access to the external readout line among the plurality of pixels by selectively activating a readout switch located within each pixel using a selection signal.

3. The event sensor of claim 1, wherein samples of pixel data transferred to the external processing circuit from an output of each pixel in an analog domain is converted into a digital domain prior to reaching an input terminal of the comparator.

4. The event sensor of claim 1, wherein the external processing circuit is further configured to output grayscale image data defining an absolute value of the intensity of incident illumination at each pixel.

5. The event sensor of claim 1, wherein the external readout line is capacitively coupled to the external processing circuit.

6. The event sensor of claim 1, wherein the plurality of pixels form a column of a pixel array.

7. A pixel comprising:
   a photodetector circuit configured to generate, at a sample node, pixel data, wherein, in a first state, the pixel data provides a differential value of the intensity of incident illumination and, in a second state, the pixel data provides an absolute value of the intensity of the incident illumination;
   an output node coupled to an external processing circuit via an external readout line shared among a plurality of pixels, the external processing circuit configured to output a stream of pixel events, each respective pixel event generated when a comparator of the external processing circuit obtains a sample of pixel data from a particular pixel via the external readout line that breaches a threshold value; and
   a readout switch intervening between the photodetector circuit and the output node that is configured to isolate the sample node from the output node until a selection signal is received from a controller of the external processing circuit.

8. The pixel of claim 7, wherein the photodetector circuit includes a logarithmic amplifier configured to convert photocurrent that is proportional to the intensity of incident illumination into a voltage.

9. The pixel of claim 7, wherein the photodetector circuit includes a photodiode coupled to the sample node via a buffer amplifier.

10. The pixel of claim 7, further comprising:
a capacitor intervening between the photodetector circuit and the switch.

11. The pixel of claim 10, further comprising:
a grayscale switch coupled in parallel with the capacitor, the grayscale switch configured to transition to a closed state in response to receiving a grayscale signal from the controller, wherein the pixel data provides an absolute value of the intensity of incident illumination when the grayscale switch is in the closed state.

12. The pixel of claim 7, further comprising:
a switched capacitor amplifier intervening between the photodetector circuit and the switch.

13. The pixel of claim 12, wherein an operating point of the switched capacitor amplifier is reset in response to receiving a reset signal from the controller.

14. The pixel of claim 12, wherein an operating point of the switched capacitor amplifier is reset in response to receiving the selection signal and a reset signal from the controller.

15. The pixel of claim 7, wherein a voltage of the pixel data at the sample node is set to a reference voltage associated with the threshold value in response to receiving a reset signal at the pixel.

16. An event sensor comprising:
an external readout line shared among a plurality of pixels, each pixel configured to output pixel data, wherein, in a first state, the pixel data provides a differential value of the intensity of incident illumination and, in a second state, the pixel data provides an absolute value of the intensity of the incident illumination; and
an external processing circuit configured to output a stream of pixel events, each respective pixel event generated when a comparator of the external processing circuit obtains a sample of pixel data from a particular pixel via the external readout line that breaches a threshold value.

17. The event sensor of claim 16, wherein each pixel includes a sampling node coupled to the external readout line via a readout switch, and wherein the external processing circuit comprises a controller configured to reset a voltage appearing at the sampling node each time the readout switch is activated.

18. The event sensor of claim 16, wherein the external processing circuit includes a differencing circuit configured to remove a direct current voltage component from samples of pixel data provided to the comparator.

19. The event sensor of claim 16, wherein the external processing circuit is further configured to output data defining an absolute value of the intensity of incident illumination at each pixel.

20. The event sensor of claim 16, wherein each respective pixel event includes address information for the particular pixel producing the sample of pixel data that breaches the threshold value, the address information being determined based on a time that the comparator obtains the sample.

* * * * *